(12) United States Patent
Matsumoto et al.

(10) Patent No.: US 12,298,837 B2
(45) Date of Patent: May 13, 2025

(54) VOLTAGE CONTROL DEVICE

(71) Applicant: SONY SEMICONDUCTOR SOLUTIONS CORPORATION, Kanagawa (JP)

(72) Inventors: Tomohiro Matsumoto, Kanagawa (JP); Yasumasa Hasegawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 875 days.

(21) Appl. No.: 17/422,974

(22) PCT Filed: Dec. 17, 2019

(86) PCT No.: PCT/JP2019/049265
§ 371 (c)(1),
(2) Date: Jul. 14, 2021

(87) PCT Pub. No.: WO2020/153047
PCT Pub. Date: Jul. 30, 2020

(65) Prior Publication Data
US 2022/0075444 A1 Mar. 10, 2022

(30) Foreign Application Priority Data

Jan. 24, 2019 (JP) .................................. 2019-009847

(51) Int. Cl.
*G06F 1/3296* (2019.01)
*G06N 3/045* (2023.01)

(52) U.S. Cl.
CPC ........... *G06F 1/3296* (2013.01); *G06N 3/045* (2023.01)

(58) Field of Classification Search
CPC ...... G06F 1/3296; G06N 3/045; G06N 3/065; Y02D 10/00

(Continued)

(56) References Cited

U.S. PATENT DOCUMENTS

| 2015/0269483 A1* | 9/2015 | Nishitani | G06N 3/065 |
| | | | 706/25 |
| 2017/0368682 A1* | 12/2017 | Danjo | G06N 3/049 |
| 2019/0087712 A1* | 3/2019 | Sundaresan | G06N 3/045 |

FOREIGN PATENT DOCUMENTS

| CN | 1656472 A | 8/2005 |
| CN | 1890574 A | 1/2007 |

(Continued)

OTHER PUBLICATIONS

Voltage and reactive power control using recurrent neural networks, Kojima et al, Electrical Engineering in Japan, vol. 114, No. 4, 1994 (Year: 1994).*

(Continued)

*Primary Examiner* — Hope C Sheffield
(74) *Attorney, Agent, or Firm* — CHIP LAW GROUP

(57) ABSTRACT

There is provided a voltage control device that automatically sets a limit operating voltage.

Provided is a voltage control device including a first neural network, a second neural network, an inference result determination unit, and a voltage determination unit, in which the inference result determination unit has a function of comparing correct answer value data held by the inference result determination unit with inference result data of the first neural network to obtain determination result data, and the voltage determination unit has a function of outputting a voltage signal lower than a voltage supplied to the first neural network and the second neural network in a case where the correct answer value data and the inference result data match, and outputting a voltage signal higher than the voltage supplied to the first neural network and the second neural network in a case where the correct answer value data and the inference result data do not match, on the basis of the determination result data.

9 Claims, 7 Drawing Sheets

(58) Field of Classification Search
USPC .......................................................... 706/23
See application file for complete search history.

(56) References Cited

FOREIGN PATENT DOCUMENTS

| | | | |
|---|---|---|---|
| CN | 106875940 | A | 6/2017 |
| CN | 107239852 | A | 10/2017 |
| CN | 107562113 | A | 1/2018 |
| CN | 108009640 | A | 5/2018 |
| JP | H0643948 | A | 2/1994 |
| JP | 2013-050841 | A | 3/2013 |
| JP | 2018-005297 | A | 1/2018 |

OTHER PUBLICATIONS

International Search Report and Written Opinion of PCT Application No. PCT/JP2019/049265, issued on Jan. 28, 2020, 08 pages of ISRWO.

Yang, et al., "Approximate SRAM for Energy-Efficient, Privacy-Preserving Convolutional Neural Networks", IEEE, Computer Society Annual Symposium on VLSI, 2007, pp. 689-694.

\* cited by examiner

VOLTAGE CONTROL DEVICE

CROSS REFERENCE TO RELATED APPLICATIONS

This application is a U.S. National Phase of International Patent Application No. PCT/JP2019/049265 filed on Dec. 17, 2019, which claims priority benefit of Japanese Patent Application No. JP 2019-009847 filed in the Japan Patent Office on Jan. 24, 2019. Each of the above-referenced applications is hereby incorporated herein by reference in its entirety.

TECHNICAL FIELD

The present technology relates to a voltage control device.

BACKGROUND ART

In recent years, learning using a deep neural network (DNN) (deep learning) has attracted attention. Data used for learning is stored in a semiconductor storage element such as a static random access memory (SRAM) of a neural network. In the learning of the neural network, the semiconductor storage element may be accessed tens of thousands of times, and thus most of the consumed power is consumed by the semiconductor storage element. Therefore, reduction of this power consumption is required.

In order to reduce the power consumption, it is effective to reduce a supply voltage to the neural network. In Non-Patent Document 1, a learning neural network learns in an environment in which a supply voltage to a SRAM of the learning neural network is low and errors in the SRAM are likely to occur. When this supply voltage becomes a predetermined value or less, an error rate (Error Rate) of the learning neural network increases. Therefore, the author of Non-Patent Document 1 sets a threshold value for the error rate, an acceptable error rate, and the lowest supply voltage (limit operating voltage) at which this acceptable error rate is kept. Then, the limit operating voltage is 0.5 V or less while a normal voltage is 0.8 V. The above is described in Non-Patent Document 1.

CITATION LIST

Non-Patent Document

Non-Patent Document 1: Lita Y, Boris M, "Approximate SRAM for Energy-Efficient, Privacy-Preserving Convolutional Neural Networks", IEEE, 2017 IEEE Computer Society Annual Symposium on VLSI (2017): 689-694

SUMMARY OF THE INVENTION

Problems to be Solved by the Invention

In Non-Patent Document 1, the learning neural network and an inference neural network are used. Coefficient data and the like obtained by the learning by the learning neural network are stored in a SRAM of the inference neural network, and the inference neural network makes an inference. Therefore, it is desirable that the limit operating voltage obtained at the time of learning can be applied also at the time of inference.

However, process, voltage, and temperature (PVT) conditions at the time of learning and the PVT conditions at the time of inference may differ. Thus, there is a problem that the limit operating voltage obtained at the time of learning cannot be applied to the inference neural network as it is.

Therefore, a main purpose of the present technology is to reduce the power consumption by providing a voltage control device that automatically sets a limit operating voltage.

Solutions to Problems

The present technology provides a voltage control device including a first neural network, a second neural network, an inference result determination unit, and a voltage determination unit, in which the first neural network has a function of inferring on the basis of learned information, the second neural network has a function of inferring on the basis of unlearned information, the inference result determination unit has a function of comparing correct answer value data held by the inference result determination unit with inference result data of the first neural network to obtain determination result data, and the voltage determination unit has a function of outputting a voltage signal lower than a voltage supplied to the first neural network and the second neural network in a case where the correct answer value data and the inference result data match, and outputting a voltage signal higher than the voltage supplied to the first neural network and the second neural network in a case where the correct answer value data and the inference result data do not match, on the basis of the determination result data.

The first neural network may be a duplicate of a part or all of components of the second neural network.

The first neural network may include a part of components of the second neural network.

Each of the first neural network and the second neural network may include at least a storage unit and a plurality of processing elements.

The voltage determination unit may include at least a voltage difference determination unit and a voltage difference signal conversion unit, the voltage difference determination unit may have a function of determining, on the basis of the determination result data, a voltage difference between the voltage supplied to the first neural network and a changed voltage, and outputting a voltage difference signal, and the voltage difference signal conversion unit may have a function of converting the voltage difference signal and outputting the voltage signal.

The voltage determination unit may output, on the basis of the determination result data and the voltage, a voltage signal lower than the voltage supplied to the first neural network and the second neural network in a case where the correct answer value data and the inference result data match and the voltage supplied to the first neural network is higher than a predetermined value.

The voltage control device may further include a voltage supply unit, in which the voltage supply unit may have a function of supplying the voltage to the first neural network and the second neural network on the basis of the voltage signal output by the voltage determination unit.

The voltage supply unit may include at least a DA converter, and the DA converter may have a function of converting the voltage signal, which is a digital signal, into the voltage, which is an analog signal, and outputting the voltage.

The voltage supplied to the first neural network may be defined as a first supply voltage, the voltage supplied to the second neural network may be defined as a second supply voltage, and the voltage supply unit may have a function of supplying the second supply voltage higher than the first supply voltage to the second neural network.

In the present technology, the lowest voltage supplied to the first neural network, at which an error occurrence rate of the first neural network is within a permissible range, is called a limit operating voltage.

MODE FOR CARRYING OUT THE INVENTION

Hereinafter, suitable modes for carrying out the present technology will be described with reference to the accompanying drawings. Note that embodiments described below show typical embodiments of the present technology, and the scope of the present technology is not limited to these embodiments. Note that the present technology will be described in the following order.

1. First Embodiment according to Present Technology (Basic Configuration)
2. Second Embodiment according to Present Technology (Voltage Supply Unit)
3. Third Embodiment according to Present Technology (Different Supply Voltage)
1. First Embodiment according to Present Technology (Basic Configuration)

Figure 1:
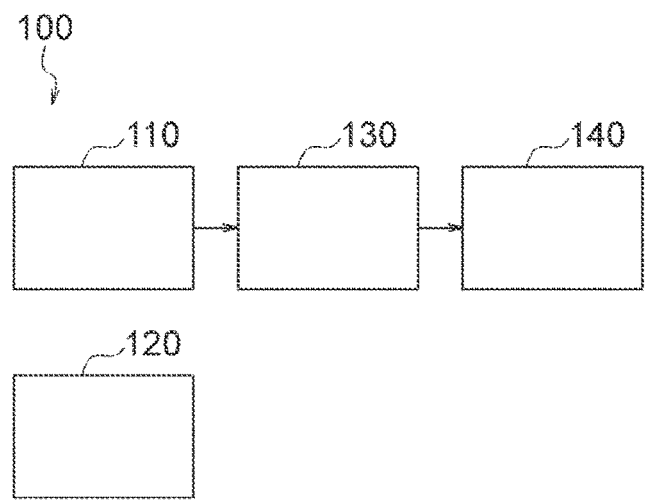
FIG. 1 is an overall configuration diagram of a voltage control device according to the present technology.

FIG. 1 illustrates an overall configuration diagram of a voltage control device 100 according to the present technology. As illustrated in FIG. 1, the voltage control device 100 according to the present technology includes a first neural network 110, a second neural network 120, an inference result determination unit 130, and a voltage determination unit 140.

The first neural network 110 and the second neural network 120 have a function of inferring what input data is.

For example, in a case where image data of a cat is input, the first neural network 110 and the second neural network 120 infer whether or not this image is an image of a cat. The input data may be, for example, voice, symbols, numbers, characters, signals, or the like in addition to images.

The first neural network 110 has a function of inferring on the basis of already learned information. The second neural network 120 has a function of inferring on the basis of unlearned information.

The first neural network 110 is a duplicate (replica) of a part or all of components of the second neural network 120. As a result, the first neural network 110 and the second neural network 120 can perform the same operation.

The inference result determination unit 130 has a function of determining whether an inference result of the first neural network 110 is correct or incorrect to obtain determination result data. More specifically, the inference result determination unit 130 compares correct answer value data held by the inference result determination unit 130 with inference result data of the first neural network 110, and outputs the determination result data. For example, in a case where the correct answer value data is a cat and the inference result data is also a cat, the determination result data has a correct answer value.

The voltage determination unit 140 has a function of determining a voltage supplied to the first neural network 110 and the second neural network 120 on the basis of the determination result data output by the inference result determination unit 130. More specifically, in a case where the correct answer value data and the inference result data match, the voltage determination unit 140 has a function of outputting a voltage signal lower than the voltage supplied to the first neural network 110 and the second neural network 120. On the other hand, in a case where the correct answer value data and the inference result data do not match, the voltage determination unit 140 has a function of outputting a voltage signal higher than the voltage supplied to the first neural network 110 and the second neural network 120.

Figure 2:
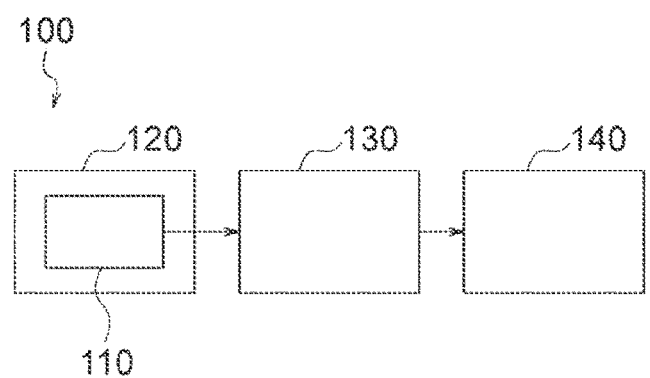
FIG. 2 is an overall configuration diagram of the voltage control device according to the present technology.

FIG. 2 illustrates another overall configuration diagram of the voltage control device 100 according to the present technology. As illustrated in FIG. 2, the first neural network 110 may include a part of the components of the second neural network 120. That is, the first neural network 110 may operate as the first neural network 110 at one time and operate as a part of the second neural network 120 at another time. For example, when inferring on the basis of the already learned information, the first neural network 110 may operate as the first neural network 110, and when inferring on the basis of the unlearned information, the first neural network 110 may operate as a part of the second neural network 120.

In order to reduce the power consumption of the first neural network 110 and the second neural network 120, it is effective to lower the voltage supplied to the first neural network 110 and the second neural network 120. Therefore, in a case where the inference result data and the correct answer value data match, the voltage determination unit 140 outputs the voltage signal lower than the voltage supplied to the first neural network 110 and the second neural network 120.

As described above, the first neural network 110 has the function of inferring on the basis of the learned information. Therefore, the inference result data of the first neural network 110 and the correct answer value data usually match. In a case where the inference result data and the correct answer value data do not match, it means that the voltage supplied to the first neural network 110 is lower than a limit operating voltage $V_L$. In this case, the voltage determination unit 140 outputs the voltage signal higher than the voltage supplied to the first neural network 110 and the second neural network 120.

As a result, the first neural network 110 and the second neural network 120 operate at a voltage near the limit operating voltage $V_L$. Therefore, the power consumption of the first neural network 110 and the second neural network 120 can be reduced.

That is, the voltage control device 100 can automatically set the limit operating voltage.

Figure 3:
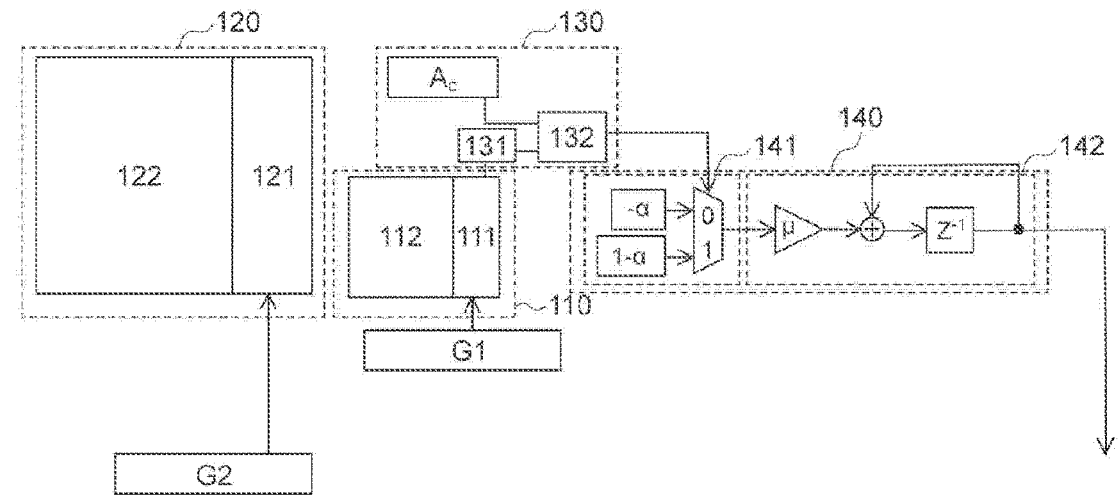
FIG. 3 is an embodiment of the voltage control device according to the present technology.

FIG. 3 illustrates an embodiment in which the voltage control device 100 according to the present technology is embodied. As illustrated in FIG. 3, the voltage control device 100 according to the present technology includes the first neural network 110, the second neural network 120, the inference result determination unit 130, and the voltage determination unit 140.

The first neural network 110 can include at least a storage unit 111 and a processing element group 112. The processing element group 112 includes a plurality of processing elements. As the storage unit 111, a semiconductor storage element such as a SRAM can be used, for example.

Similarly to the first neural network 110, the second neural network 120 can include at least a storage unit 121 and a processing element group 122.

The inference result determination unit 130 has a function of comparing correct answer value data $A_C$ held by the inference result determination unit 130 with the inference result data of the first neural network 110 to obtain the determination result data.

Figure 4:
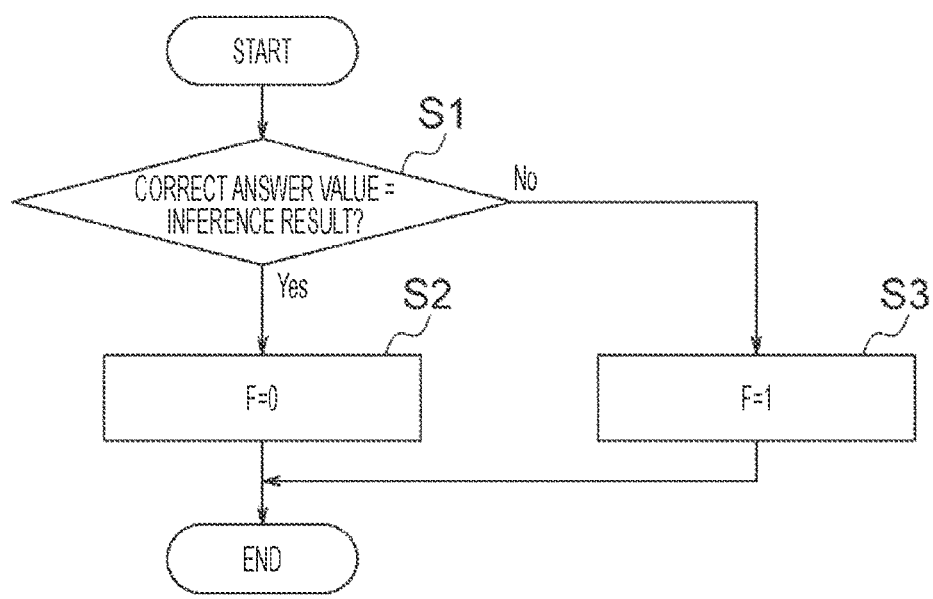
FIG. 4 is a flowchart of an inference result determination unit according to the present technology.

Here, FIG. 4 illustrates a flowchart of the inference result determination unit 130. As illustrated in FIG. 4, the inference result determination unit 130 compares the correct answer value data $A_C$ held by the inference result determination unit 130 with the inference result data of the neural network 110 (S1).

In a case where the correct answer value data $A_c$ and the inference result data match (S1: Yes), the inference result determination unit 130 sets the value "0" in a determination result flag F, which is the determination result data (S2). On the other hand, in a case where the correct answer value data $A_C$ and the inference result data do not match (S1: No), the inference result determination unit 130 sets the value "1" in the determination result flag F (S3).

Figure 5:
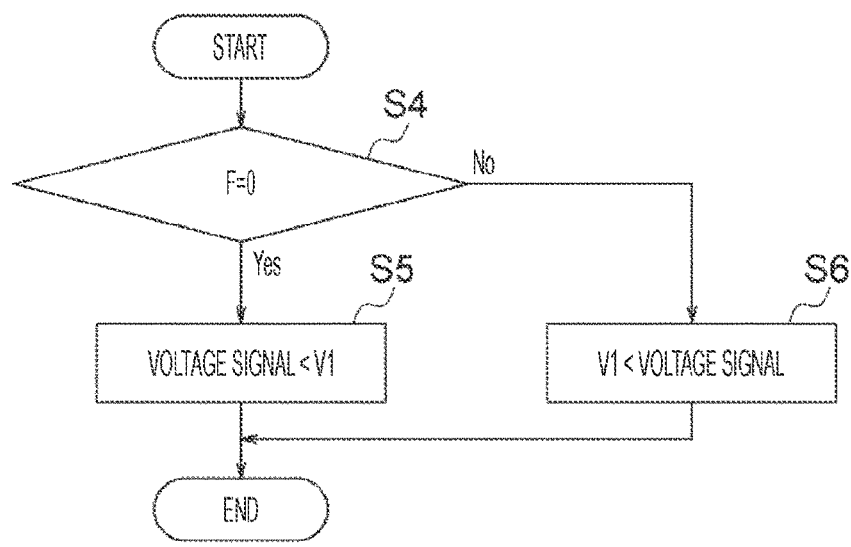
FIG. 5 is a flowchart of a voltage determination unit according to the present technology.

The voltage determination unit 140 operates on the basis of the value of the determination result flag F. FIG. 5 illustrates a flowchart of the voltage determination unit 140.

As illustrated in FIG. 5, in a case where the value "0" is set in the determination result flag F (S4: Yes), the voltage determination unit 140 outputs a voltage signal lower than a voltage V1 supplied to the neural network 110 (S5).

On the other hand, in a case where the value "1" is set in the determination result flag (S4: No), the voltage determination unit 140 outputs a voltage signal higher than the voltage V1 supplied to the neural network 110 (S6).

Figure 6:
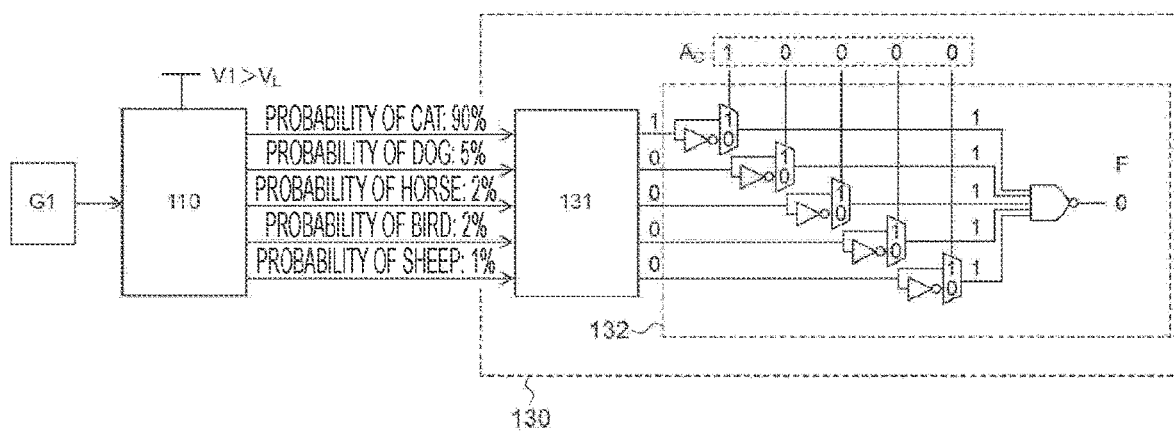
FIG. 6 is an embodiment of a first neural network and the inference result determination unit according to the present technology.
Figure 7:
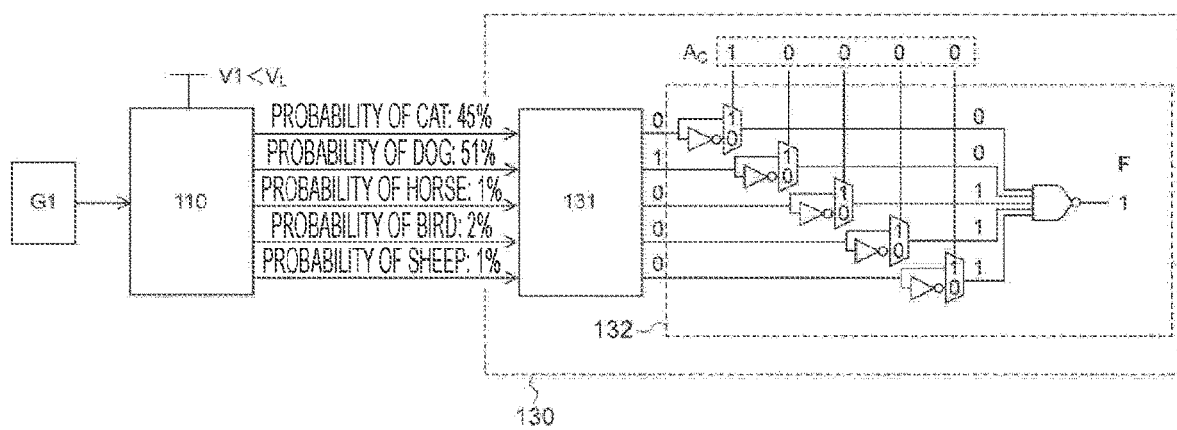
FIG. 7 is the embodiment of the first neural network and the inference result determination unit according to the present technology.

Subsequently, FIGS. 6 and 7 illustrate one embodiment of the first neural network 110 and the inference result determination unit 130. FIG. 6 illustrates processing in a case where the first neural network 110 can infer correctly. FIG. 7 illustrates processing in a case where the first neural network 110 cannot infer correctly.

First, the processing in the case where the first neural network 110 can infer correctly will be described with reference to FIG. 6. As illustrated in FIG. 6, image data G1 is input to the first neural network 110. In this example, the image data G1 is an image of a cat.

In the inference result data of the first neural network 110, the probability that the image data G1 is a cat is 90%, the probability that the image data G1 is a dog is 5%, the probability that the image data G1 is a horse is 2%, the probability that the image data G1 is a bird is 2%, and the probability that the image data G1 is a sheep is 1%.

The voltage V1 supplied to the first neural network 110 is higher than the limit operating voltage VL. Therefore, the first neural network 110 can infer correctly.

A binarization unit 131 included in the inference result determination unit 130 binarizes the inference result data of the first neural network 110 to "0" or "1" with a predetermined value, for example, 50% as a threshold value. In a case where the probability in the inference result data is higher than 50%, the binarization unit 131 outputs the value "1". In a case where the probability in the inference result data is 50% or less, the binarization unit 131 outputs the value "0". Note that the threshold value does not have to be 50%.

In this embodiment, the probability that the image data is a cat is 90%, which is higher than the threshold value of 50%, and thus the binarization unit 131 sets the value of an item of a cat to "1". For the other items (dog, horse, bird, and sheep), the probability is 50% or less, and thus the binarization unit 131 sets the values of these items to "0".

Since the image data is the image data of a cat, the correct answer is a cat. Therefore, in the correct answer value data $A_C$, the value of the item of a cat is "1", and the values of the other items (dog, horse, bird, and sheep) are "0".

Subsequently, a correct answer comparison unit 132 included in the inference result determination unit 130 compares the inference result data with the correct answer value data $A_C$. For the item of a cat, the value of the inference result data is "1", the value of the correct answer value data $A_C$ is "1", and thus "1" is set as a determination value. For the other items (dog, horse, bird, and sheep), the values of the inference result data are "0", the values of the correct answer value data $A_C$ are "0", and thus "1" is set as determination values.

Since the determination values of all the items are set to "1" by the above processing, the inference result determination unit 130 sets the value "0" in the determination result flag F.

On the other hand, the processing in the case where the first neural network 110 cannot infer correctly will be described with reference to FIG. 7. Also in the example illustrated in FIG. 7, the image data G1 is an image of a cat.

In the inference result data of the first neural network 110, the probability that the image data is a cat is 45%, the probability that the image data is a dog is 51%, the probability that the image data is a horse is 1%, the probability that the image data is a bird is 2%, and the probability that the image data is a sheep is 1%.

The voltage V1 supplied to the first neural network 110 is lower than the limit operating voltage $V_L$. Therefore, the first neural network 110 cannot infer correctly.

In this embodiment, the probability that the image data is a dog is 51%, which is higher than the threshold value of 50%, and thus the binarization unit 131 sets the value of an item of a dog to "1". For the other items (cat, horse, bird, and sheep), the probability is 50% or less, and thus the binarization unit 131 sets the values of these items to "0".

Subsequently, the correct answer comparison unit 132 compares the inference result data with the correct answer value data $A_C$. For the item of a cat, the value of the inference result data is "0", the value of the correct answer value data $A_c$ is "1", and thus "0" is set as a determination value. For the item of a dog, the value of the inference result data is "1", the value of the correct answer value data $A_C$ is "0", and thus "0" is set as a determination value. For the other items (horse, bird, and sheep), the values of the inference result data are "0", the values of the correct answer value data $A_C$ are "0", and thus "1" is set as determination values.

Since the determination value in which the value "0" is set and the determination value in which the value "1" is set are mixed by the above processing, the inference result determination unit 130 sets the value "1" in the determination result flag F.

The subsequent voltage determination unit 140 operates on the basis of this determination result flag F. Here, returning to the description of FIG. 3, the voltage determination unit 140 includes at least a voltage difference determination unit 141 and a voltage difference signal conversion unit 142, as illustrated in FIG. 3.

The voltage difference determination unit 141 has a function of determining a voltage difference between the voltage supplied to the first neural network 110 and a changed voltage on the basis of the determination result data, and outputting a voltage difference signal to the voltage difference signal conversion unit 142.

The voltage difference determination unit 141 holds a ratio between a voltage difference when the supply voltage V1 to the first neural network is lowered and a voltage difference when the supply voltage V1 is raised. The ratio between the voltage difference when the supply voltage V1 is lowered and the voltage difference when the supply voltage V1 is raised can be $\alpha: (1-\alpha)$. For example, $\alpha$ can be a value larger than 0 and less than 0.5.

The voltage difference signal conversion unit 142 has a function of converting the voltage difference signal and outputting the voltage signal. The voltage difference signal conversion unit 142 can include, for example, an integrator.

Figure 8:
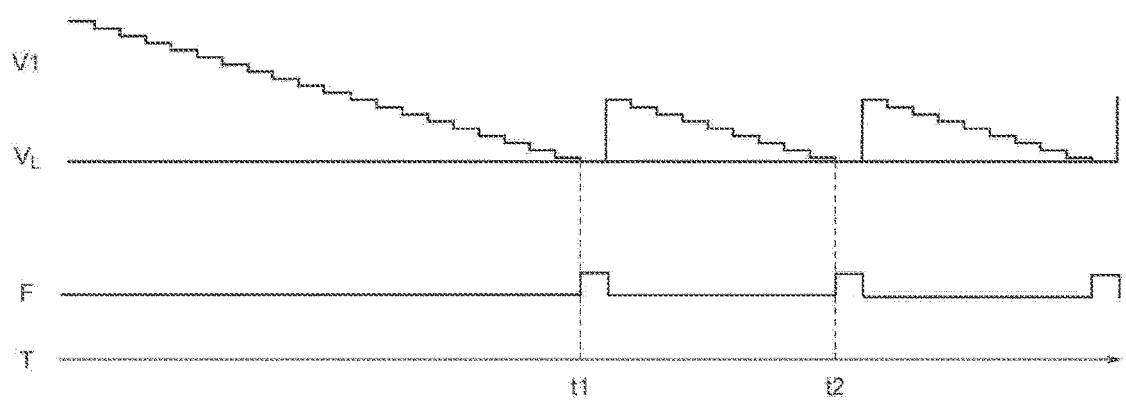
FIG. 8 is an example of the operation of a voltage difference determination unit according to the present technology.

The operation of the voltage determination unit 140 will be specifically described. First, an example of the operation of the voltage difference determination unit 141 included in the voltage determination unit 140 will be described with reference to FIG. 8. FIG. 8 illustrates the supply voltage V1 to the first neural network, the limit operating voltage $V_L$, the value of the determination result flag F, and time T.

The value of the determination result flag F is indicated by 0 and 1. A low value that is flat is 0, and a high value that protrudes is 1.

When the value of the determination result flag F is 0, the supply voltage V1 is lowered. When the supply voltage V1 is gradually lowered and the supply voltage V1 reaches the limit operating voltage $V_L$ at time t1, the value of the determination result flag F becomes 1, and the supply voltage V1 is raised.

Furthermore, when the supply voltage V1 is gradually lowered again and the supply voltage V1 reaches the limit operating voltage $V_L$ at time t2, the value of the determination result flag F becomes 1, and the supply voltage V1 is raised.

In the embodiment illustrated in FIG. 8, a case of $\alpha=0.1$ is shown. Therefore, the ratio between the voltage difference when the supply voltage V1 is lowered and the voltage difference when the supply voltage V1 is raised is 0.1:(1−0.1)=0.1:0.9=1:9.

In addition, the supply voltage V1 is raised once every (1−$\alpha$)/$\alpha$+1 times. In this embodiment, since $\alpha=0.1$, the supply voltage V1 is raised once every (1−0.1)/0.1+1=10 times.

The smaller the value of $\alpha$, the less frequently the supply voltage V1 is raised. On the other hand, the larger the value of $\alpha$, the more frequently the supply voltage V1 is raised. Therefore, the value of $\alpha$ is varied, so that the frequency with which the supply voltage V1 is raised can be adjusted.

Note that the ratio between the voltage difference when the supply voltage V1 is lowered and the voltage difference when the supply voltage is raised is not limited to $\alpha: 1-\alpha$, and may be, for example, $\alpha:1$.

Figure 9:
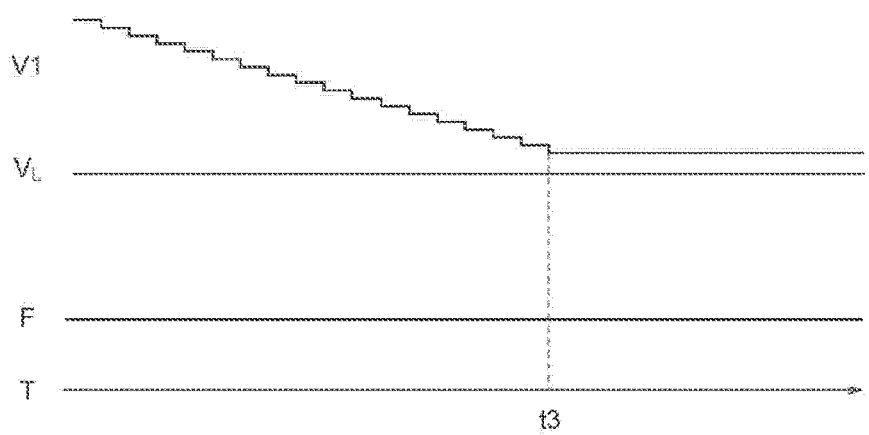
FIG. 9 is an example of the operation of the voltage difference determination unit according to the present technology.

An example of other operation of the voltage difference determination unit 141 will be described with reference to FIG. 9. FIG. 9 illustrates the supply voltage V1 to the first neural network 110, the limit operating voltage $V_L$, the value of the determination result flag F, and the time T.

When the value of the determination result flag F is 0, the supply voltage V1 is gradually lowered, but when the supply voltage V1 approaches the limit operating voltage $V_L$ at time t3, the supply voltage V1 is not lowered any more. As a result, in time after the time t3, the first neural network 110 does not make an erroneous inference even though the supply voltage is low. In a case where the first neural network 110 is not actively operating and can operate even at a low supply voltage, this state may be kept.

Figure 10:
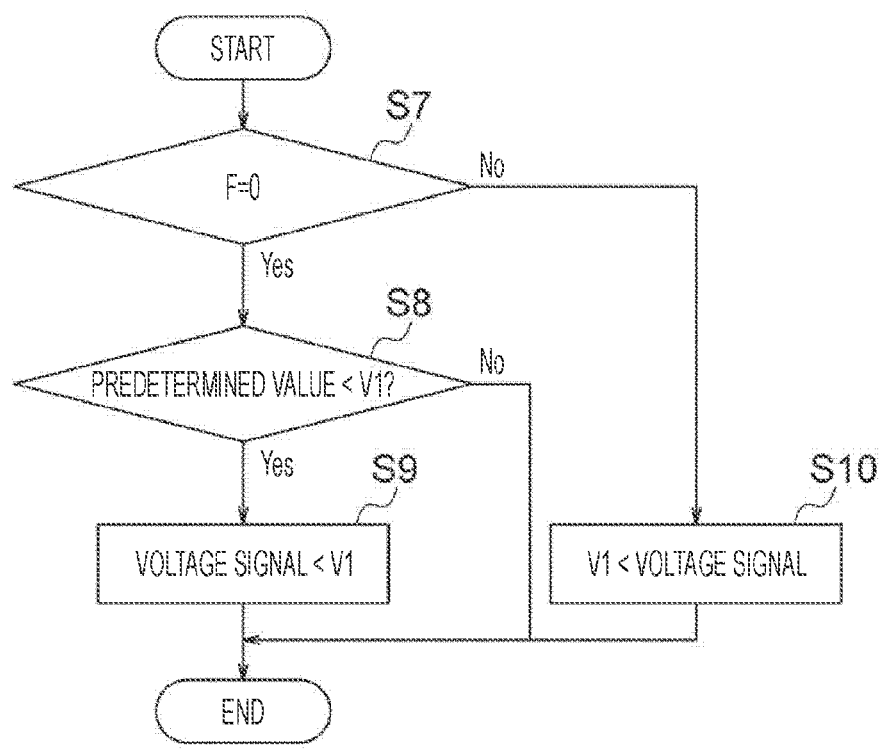
FIG. 10 is a flowchart of the voltage determination unit according to the present technology.

FIG. 10 illustrates a flowchart of the voltage determination unit 140 in this case. As illustrated in FIG. 10, in a case where the correct answer value data and the inference result data match, the value "0" is set in the determination result flag F (S7: Yes), and the voltage V1 supplied to the first neural network 110 is higher than a predetermined value (S8: Yes), the voltage determination unit 140 outputs the voltage signal lower than the voltage supplied to the first neural network and the second neural network (S9).

In a case where the value "0" is set in the determination result flag F (S7: Yes), and the voltage V1 supplied to the first neural network 110 is the predetermined value or less (S8: No), the voltage determination unit 140 does not change the voltage signal.

In a case where the correct answer value data and the inference result data do not match, and the value "1" is set in the determination result flag (S7: No), the voltage determination unit 140 outputs the voltage signal higher than the voltage V1 supplied to the neural network 110 (S10).

Subsequently, returning to the description of FIG. 3, the voltage difference signal conversion unit 142 included in the voltage determination unit 140 will be described. The voltage difference signal conversion unit 142 has a function of converting the voltage difference signal output from the voltage difference determination unit 141 and outputting the voltage signal.

Specifically, the voltage difference signal conversion unit 142 multiplies, by $\mu$, the voltage difference output from the voltage difference determination unit 141, for example. For example, $\mu$ can be a value larger than 0 and much less than 1.

The smaller the value of $\mu$, the smaller a potential difference at which the supply voltage V1 changes. On the other hand, the larger the value of $\mu$, the larger the potential difference at which the supply voltage V1 changes. Therefore, the value of $\mu$ is varied, so that the potential difference at which the supply voltage V1 changes can be adjusted.

2. Second Embodiment according to Present Technology (Voltage Supply Unit)

Figure 11:
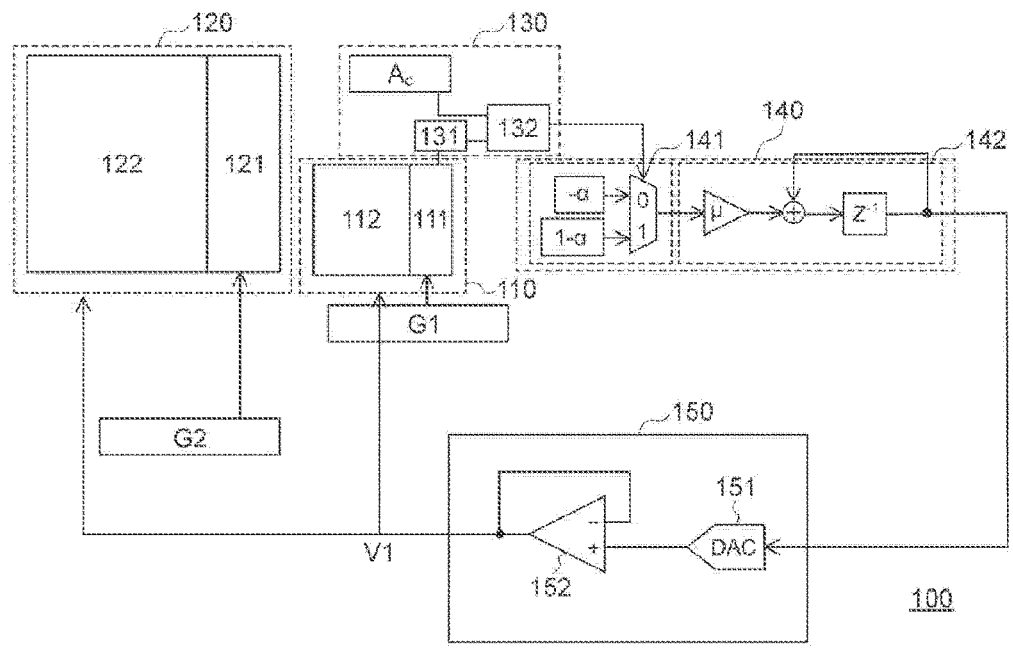
FIG. 11 is an embodiment of the voltage control device according to the present technology.

FIG. 11 illustrates another embodiment of a voltage control device 100 according to the present technology. Note that a detailed description will be omitted for overlapping parts of FIGS. 11 and 3.

As illustrated in FIG. 11, the voltage control device 100 can further include a voltage supply unit 150. The voltage supply unit 150 has a function of supplying a voltage to a first neural network 110 and a second neural network 120 on the basis of a voltage signal output by a voltage determination unit 140.

The voltage supply unit 150 can include at least a DA converter 151. The DA converter 151 can convert a digital signal into an analog signal. The voltage signal output by the voltage determination unit 140 is a digital signal. A supply voltage to the first neural network 110 and the second neural network 120 is an analog signal. Therefore, conversion processing by the DA converter 151 is required.

The voltage supply unit 150 can further include a buffer 152. If an output voltage of the DA converter 151 is supplied to the first neural network 110 and the like as it is, a load on the DA converter 151 and the like is high. Therefore, the buffer 152 converts the output voltage of the DA converter 151 and supplies the converted voltage to the first neural network 110 and the like. A low dropout linear regulator (LDO) or DC/DC converter can be used as the buffer 152, for example.

3. Third Embodiment According to Present Technology (Different Supply Voltage)

Figure 12:
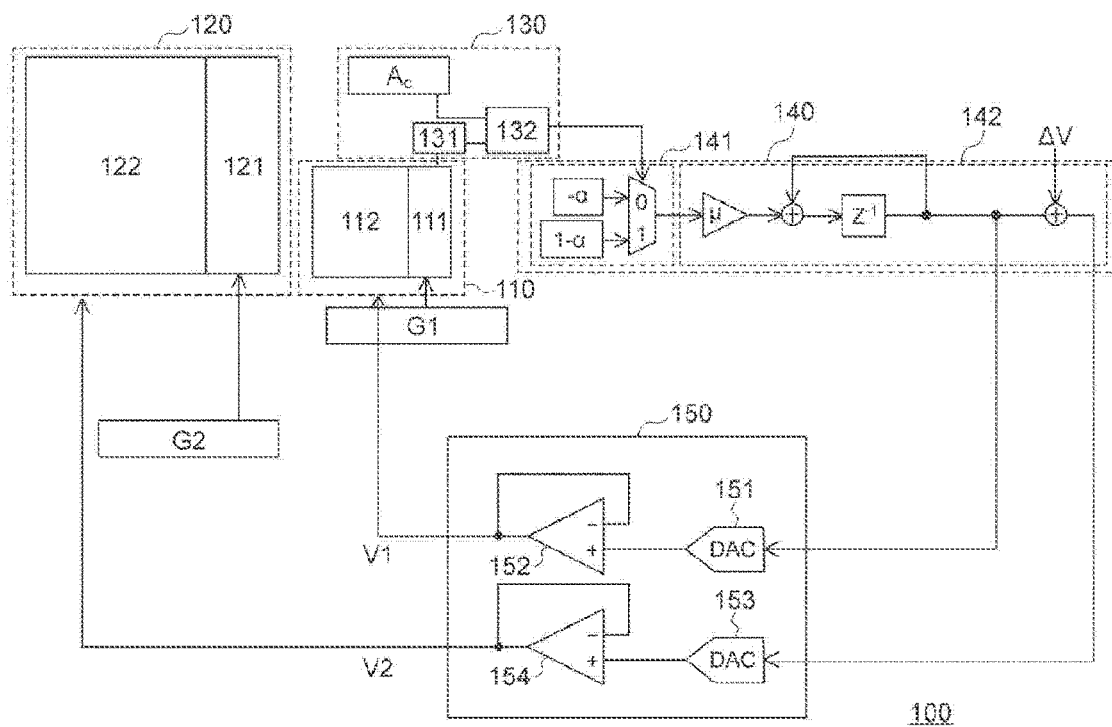
FIG. 12 is an embodiment of the voltage control device according to the present technology.

FIG. 12 illustrates another embodiment in which a voltage control device 100 according to the present technology is embodied. Note that a detailed description will be omitted for overlapping parts of FIGS. 12 and 11.

A voltage supplied to a first neural network 110 is defined as a first supply voltage V1. A voltage supplied to a second neural network 120 is defined as a second supply voltage V2.

A voltage difference signal conversion unit 142 has a function of converting a voltage difference signal output by a voltage difference determination unit 141, and outputting a voltage signal corresponding to the first supply voltage V1 and a voltage signal corresponding to the second supply voltage V2, which is higher than the voltage signal corresponding to the first supply voltage V1. A voltage difference $\Delta V$ between the first supply voltage V1 and the second supply voltage V2 depends on the fluctuation of a noise, but may be, for example, 20 mV or 50 mV.

A voltage supply unit 150 has a function of supplying the first supply voltage V1 to the first neural network 110 and supplying the second supply voltage V2 higher than the first supply voltage V1 to the second neural network 120.

Figure 13:
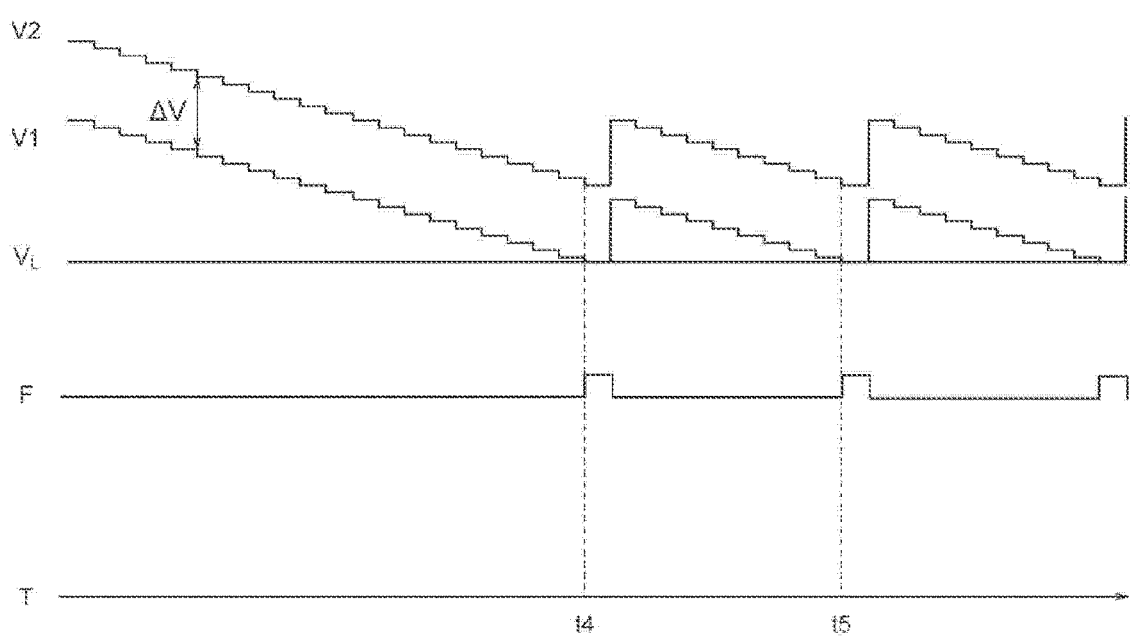
FIG. 13 is an example of the operation of the voltage difference determination unit according to the present technology.

The operation of the voltage supply unit 150 and the operation of the voltage difference determination unit 141 included in a voltage determination unit 140 will be described with reference to FIG. 13. FIG. 13 illustrates the first supply voltage V1, the second supply voltage V2, a limit operating voltage $V_L$, the value of a determination result flag F, and time T.

When the first supply voltage V1 and the second supply voltage V2 are gradually lowered and the first supply voltage V1 reaches the limit operating voltage $V_L$ at time t4, the value of the determination result flag F becomes 1, and the first supply voltage V1 and the second supply voltage V2 are raised.

Furthermore, when the first supply voltage V1 and the second supply voltage V2 are gradually lowered again and the first supply voltage V1 reaches the limit operating voltage $V_L$ at time t5, the value of the determination result flag F becomes 1, and the first supply voltage V1 and the second supply voltage V2 are raised.

The second supply voltage V2 is slightly higher than the first supply voltage V1. As a result, when the first supply voltage V1 reaches the limit operating voltage $V_L$, the first neural network 110 causes an error, but since the second supply voltage V2 does not reach the limit operating voltage $V_L$, the second neural network 120 does not cause an error.

Note that an object for which the voltage control device 100 according to the present technology controls the voltage is not limited to the neural network.

Note that the effects described in the present specification are merely examples and are not limited, and other effects may be obtained.

Note that the present technology may have the following configurations.

[1] A voltage control device including
  a first neural network,
  a second neural network,
  an inference result determination unit, and
  a voltage determination unit, in which
  the first neural network has a function of inferring on the basis of learned information,
  the second neural network has a function of inferring on the basis of unlearned information,
  the inference result determination unit has a function of comparing correct answer value data held by the inference result determination unit with inference result data of the first neural network to obtain determination result data, and
  the voltage determination unit has a function of outputting a voltage signal lower than a voltage supplied to the first neural network and the second neural network in a case where the correct answer value data and the inference result data match, and outputting a voltage signal higher than the voltage supplied to the first neural network and the second neural network in a case where the correct answer value data and the inference result data do not match, on the basis of the determination result data.

[2] The voltage control device according to [1], in which the first neural network is a duplicate of a part or all of components of the second neural network.

[3] The voltage control device according to [1] or [2], in which the first neural network includes a part of components of the second neural network.

[4] The voltage control device according to any one of [1] to [3], in which each of the first neural network and the second neural network includes at least a storage unit and a plurality of processing elements.

[5] The voltage control device according to any one of [1] to [4], in which the voltage determination unit includes at least a voltage difference determination unit and a voltage difference signal conversion unit, the voltage difference determination unit has a function of determining, on the basis of the determination result data, a voltage difference between the voltage supplied to the first neural network and a changed voltage, and outputting a voltage difference signal, and the voltage difference signal conversion unit has a function of converting the voltage difference signal and outputting the voltage signal.

[6] The voltage control device according to any one of [1] to [5], in which the voltage determination unit outputs, on the basis of the determination result data and the voltage, a voltage signal lower than the voltage supplied to the first neural network and the second neural network in a case where the correct answer value data and the inference result data match and the voltage supplied to the first neural network is higher than a predetermined value.

[7] The voltage control device according to any one of [1] to [6], further including a voltage supply unit, in which the voltage supply unit has a function of supplying the voltage to the first neural network and the second neural network on the basis of the voltage signal output by the voltage determination unit.

[8] The voltage control device according to [7], in which the voltage supply unit includes at least a DA converter, and the DA converter has a function of converting the voltage signal, which is a digital signal, into the voltage, which is an analog signal, and outputting the voltage.

[9] The voltage control device according to [7] or [8], in which the voltage supplied to the first neural network is defined as a first supply voltage, the voltage supplied to the second neural network is defined as a second supply voltage, and the voltage supply unit has a function of supplying the second supply voltage higher than the first supply voltage to the second neural network.

REFERENCE SIGNS LIST

100 Voltage control device
110 First neural network
120 Second neural network
130 Inference result determination unit
140 Voltage determination unit
141 Voltage difference determination unit
142 Voltage difference signal conversion unit
150 Voltage supply unit
151 DA converter
V1 First supply voltage
V2 Second supply voltage
$V_L$ Limit operating voltage
F Determination result flag
T Time
$A_C$ Correct answer value data

The invention claimed is:

1. A voltage control device comprising:
a first neural network;
a second neural network;
an inference result determination unit; and
a voltage determination unit, wherein
the first neural network has a function of inferring on a basis of learned information,
the second neural network has a function of inferring on a basis of unlearned information,
the inference result determination unit has a function of comparing correct answer value data held by the inference result determination unit with inference result data of the first neural network to obtain determination result data, and
the voltage determination unit has a function of outputting a voltage signal lower than a voltage supplied to the first neural network and the second neural network in a case where the correct answer value data and the inference result data match, and outputting a voltage signal higher than the voltage supplied to the first neural network and the second neural network in a case where the correct answer value data and the inference result data do not match, on a basis of the determination result data.

2. The voltage control device according to claim 1, wherein the first neural network is a duplicate of a part or all of components of the second neural network.

3. The voltage control device according to claim 1, wherein
the first neural network includes a part of components of the second neural network.

4. The voltage control device according to claim 1, wherein
each of the first neural network and the second neural network includes at least
a storage unit and
a plurality of processing elements.

5. The voltage control device according to claim 1, wherein
the voltage determination unit includes at least
a voltage difference determination unit and
a voltage difference signal conversion unit,
the voltage difference determination unit has a function of determining, on a basis of the determination result data, a voltage difference between the voltage supplied to the first neural network and a changed voltage, and outputting a voltage difference signal, and
the voltage difference signal conversion unit has a function of converting the voltage difference signal and outputting the voltage signal.

6. The voltage control device according to claim 1, wherein
the voltage determination unit outputs, on a basis of the determination result data and the voltage, a voltage signal lower than the voltage supplied to the first neural network and the second neural network in a case where the correct answer value data and the inference result data match and the voltage supplied to the first neural network is higher than a predetermined value.

7. The voltage control device according to claim 1, further comprising
a voltage supply unit, wherein
the voltage supply unit has a function of supplying the voltage to the first neural network and the second neural network on a basis of the voltage signal output by the voltage determination unit.

8. The voltage control device according to claim 7, wherein
the voltage supply unit includes at least a DA converter, and
the DA converter has a function of converting the voltage signal, which is a digital signal, into the voltage, which is an analog signal, and outputting the voltage.

9. The voltage control device according to claim 7, wherein
the voltage supplied to the first neural network is defined as a first supply voltage,
the voltage supplied to the second neural network is defined as a second supply voltage, and
the voltage supply unit has a function of supplying the second supply voltage higher than the first supply voltage to the second neural network.

* * * * *